(12) United States Patent
Nakashima et al.

(10) Patent No.: US 8,657,578 B2
(45) Date of Patent: Feb. 25, 2014

(54) GEAR BOX FOR WIND TURBINE GENERATOR AND WIND TURBINE GENERATOR

(75) Inventors: Keita Nakashima, Tokyo (JP); Kaoru Iwasaki, Tokyo (JP); Takafumi Yoshida, Tokyo (JP); Hiroaki Takeuchi, Tokyo (JP); Katsuhiko Shoda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/674,687

(22) PCT Filed: Feb. 12, 2010

(86) PCT No.: PCT/JP2010/052101
§ 371 (c)(1),
(2), (4) Date: May 15, 2010

(87) PCT Pub. No.: WO2011/099149
PCT Pub. Date: Aug. 18, 2011

(65) Prior Publication Data
US 2012/0003096 A1    Jan. 5, 2012

(51) Int. Cl.
*F03D 11/02* (2006.01)
(52) U.S. Cl.
USPC .................................. 416/170 R; 416/146 R
(58) Field of Classification Search
USPC .................. 415/124.1, 229, 121.3, 122.1; 416/170 R, 184, 146 R; 475/348, 343; 290/55; 384/571, 561, 562, 585, 558, 384/584, 903
See application file for complete search history.

(56) References Cited

U.S. PATENT DOCUMENTS

| 2,089,048 | A | * | 8/1937 | Bachman | 384/571 |
| 4,030,785 | A | * | 6/1977 | Robinson et al. | 384/474 |

(Continued)

FOREIGN PATENT DOCUMENTS

| CN | 200996467 Y | 12/2007 |
| CN | 201277153 Y | 7/2009 |

(Continued)

OTHER PUBLICATIONS

Machine translation of DE102005029075A1 from Espacenet.*

(Continued)

*Primary Examiner* — Edward Look
*Assistant Examiner* — Christopher R Legendre
(74) *Attorney, Agent, or Firm* — Kanesaka Berner & Partners, LLP (57) ABSTRACT

In an object to provide a gear box for a wind turbine generator and a wind turbine generator in which the life of the planet bearings are further enhanced, a gear box of the present invention includes a casing, a carrier, planet pins held to the carrier, planet bearings supported to the planet pins, respectively, a plurality of planet gears supported to the planet pin via the planet bearings, respectively, and a ring gear and a sun gear meshed with the planet gears. In the gear box, the carrier has an inclined surface facing the planet bearing as a part of an outer cylinder part provided on both ends of the planet pins in axial direction of the planet pin and surrounding the outer circumference of the both ends of the planet pins and the incline surface inclines such that the farther from an axial center of the planet pin, the longer a distance between the inclined surface and the planet bearing.

13 Claims, 7 Drawing Sheets

(56) References Cited

U.S. PATENT DOCUMENTS

| | | | |
|---|---|---|---|
| 4,138,168 A * | 2/1979 | Herlitzek | 384/537 |
| 4,158,972 A | 6/1979 | Chamberlain | |
| 5,002,406 A | 3/1991 | Morton et al. | |
| 6,077,183 A * | 6/2000 | Tar et al. | 475/231 |
| 7,410,442 B2 | 8/2008 | Fox | |
| 2003/0236148 A1 * | 12/2003 | Fox | 475/348 |
| 2004/0094364 A1 | 5/2004 | Hammill | |
| 2004/0141674 A1 * | 7/2004 | Leimann | 384/571 |
| 2007/0127858 A1 * | 6/2007 | Nakagawa et al. | 384/495 |
| 2010/0197446 A1 | 8/2010 | Smook | |
| 2010/0303626 A1 * | 12/2010 | Mostafi | 416/170 R |
| 2011/0033299 A1 * | 2/2011 | Leimann et al. | 416/170 R |
| 2011/0077120 A1 * | 3/2011 | Dirk | 475/348 |
| 2012/0003096 A1 * | 1/2012 | Nakashima et al. | 416/170 R |
| 2012/0208669 A1 * | 8/2012 | Nakashima et al. | 475/348 |

FOREIGN PATENT DOCUMENTS

| | | | |
|---|---|---|---|
| CN | 201367991 Y | | 12/2009 |
| CN | 201381953 Y | | 1/2010 |
| DE | 102005029075 A1 | * | 12/2006 |
| EP | 1431575 A2 | | 6/2004 |
| JP | 57-124124 A | | 8/1982 |
| JP | 57124124 A | | 8/1982 |
| JP | S60-126746 U | | 8/1985 |
| JP | H02-105633 U | | 8/1990 |
| JP | 5-33849 A | | 2/1993 |
| JP | 5-64560 U | | 8/1993 |
| JP | 564560 U | | 8/1993 |
| JP | H07-239004 A | | 9/1995 |
| JP | H08-326762 A | | 12/1996 |
| JP | H09-317760 A | | 12/1997 |
| JP | 2000-257675 A | | 9/2000 |
| JP | 2001-227597 A | | 8/2001 |
| JP | 2004011737 A | * | 1/2004 |
| JP | 2004-245356 A | | 9/2004 |
| JP | 2005036880 A | | 2/2005 |
| JP | 2006-9575 A | | 1/2006 |
| JP | 20006009575 A | | 1/2006 |
| JP | 2007-71273 A | | 3/2007 |
| JP | 2007071273 A | | 3/2007 |
| JP | 2008-031941 A | | 2/2008 |
| JP | 2009-144533 A | | 7/2009 |
| JP | 2009-250213 A | | 10/2009 |
| WO | 2009/065192 A1 | | 5/2009 |

OTHER PUBLICATIONS

International Search Report of Application No. PCT/JP2010/052101 mailed Apr. 27, 2010.
Notice of Acceptance dated Aug. 25, 2011 in Australian Patent Application No. 2010201623.
International Preliminary Report (Foreign Language Version).
International Preliminary Report (English Language Version).
PCT, "International Preliminary Report on Patentability for PCT/JP2010/052094", Sep. 18, 2012.
Canadian Intellectual Property Office, "Notice of Allowance for CA 2,694,124", Jun. 28, 2012.
Japanese Patent Office, "Decision to Grant a Patent for JP 2010-506745", Nov. 20, 2012.
Korean Patent Office, "Notice of Allowance for KR 10-2010-7008769", Nov. 23, 2012.
Office Action in corresponding U.S. Appl. No. 12/675,001 as issued on Apr. 9, 2013.
Canadian Intellectual Property Office, "Notice of Allowance for CA 2,694,130", Oct. 29, 2012.
Japanese Patent Office, "Decision to Grant a Patent for JP 2010-506740", May 31, 2012.
Korean Patent Office, "Notice of Allowance for KR 10-2010-7008806", Apr. 20, 2012.
Office Action dated Oct. 10, 2013, corresponds to related U.S. Appl. No. 12/675,001.

* cited by examiner

GEAR BOX FOR WIND TURBINE GENERATOR AND WIND TURBINE GENERATOR

RELATED APPLICATIONS

The present application is a National Phase of International Application Number PCT/JP2010/52101, filed Feb. 12, 2010, the disclosure of which is hereby incorporated by reference herein in its entirety.

BACKGROUND OF THE INVENTION

1. Technical Field

The present invention relates to a gear box for a wind turbine generator and the wind turbine, especially the gear box and the wind turbine using the gear box which increases the rotation speed and outputs the increased rotation speed from blades to a generator side via a main shaft.

2. Description of the Related Art

In recent years, from a view point of preserving the global environment, the use of wind turbine generators to generate reusable energy has become popular.

In general, a wind turbine generator comprises a rotor head equipped with blades, a nacelle accommodating a drive train and a rotation axis, and a tower supporting the nacelle. Herein, the drive train is provided for transmitting torque from the rotor head side to the generator side and usually the gear box is integrated therein so as to increase the speed of the rotor head and input the increased speed to the generator.

As a gear box for a wind turbine generator, a planetary-type gear mechanism as disclosed in Patent Document 1 is well known. In the planetary gear mechanism, a plurality of planet pins are provided on a carrier which rotate with a main shaft of the rotor head side, and planet gears are supported to the planet pins via planet bearings and a ring gear and sun gear are meshed with the planet gears. With this, as the main shaft rotate on the rotor head side, the planet gears rotates and revolves around planet pin and the increased speed is outputted to the sun gear side.

In the view of improving the life of the bearing, the lubrication oil must be supplied to the planet bearings in the gear box.

Regarding this point, in the gear box disclosed in Patent Document 1, an oil bath for reserving the lubrication oil is provided under the housing and the planet bearings pass through the oil bath and are lubricated when the planet gears revolve. Furthermore, a lubrication oil supply path is formed inside the planet pin and the lubrication oil being injected through the nozzle is supplied to the planet bearing via the lubrication oil supply path.

RELATED PATENT DOCUMENT

[Patent Document 1]
JP2009-144533A

SUMMARY OF THE INVENTION

However, as larger wind turbine generators are being made for the purpose of generating more electricity, it is desired to develop a gear box equipped with planet bearings that can withstand a large load for a long period of time.

Therefore, in the gear box for the wind turbine generator disclosed in Patent Document 1, the life of the planet bearings is not always long. Especially, as for a wind turbine generator specifically for cold weather, the air is so cold that the viscosity of lubricating oil rises and thus the planet bearings cannot be lubricated sufficiently.

In a view of the above problem, it is an object of the present invention to provide a gear box for a wind turbine generator and a wind turbine generator in which the life of the planet bearings are further enhanced.

MEANS TO SOLVE THE PROBLEMS

The present invention provides a gear box for a wind turbine generator, having a main shaft coupled to a rotor head equipped with blades and rotated with the rotor head, comprising: a casing; a carrier having a plurality of planet pins and rotating with the main shaft of the wind turbine generator to revolve the planet pins; planet roller bearings installed to the planet pins of the carrier, respectively, each of the bearings including rollers provided between an inner race and an outer race; a plurality of planet gears supported rotatably to the planet pins via the planet bearings, respectively; a ring gear provided in the casing and having an inner tooth meshed with the planet gears; a sun gear provided to be surrounded by the planet gears and meshed with the planet gears; and an oil bath provided under the casing and reserving lubrication oil inside, wherein the carrier comprises an outer cylinder part provided on both ends of the planet pins in axial direction of the planet pin and surrounding the outer circumference of the both ends of the planet pins so as to hold the planet pins, and wherein the outer cylinder part of the carrier includes an inclined surface facing the planet bearing, the inclined surface inclining outward from the planet bearing in a radius direction of the planet pin. The inclined surface inclines such that the farther from an axial center of the planet pin, the longer a distance between the incline surface and the planet bearing.

With the above gear box for the wind turbine generator, the inclined surface facing the planet bearing inclines outward from the planet bearing in a radius direction of the planet pin and thus the lubrication oil can easily pass through between the outer cylinder part and the planet bearings or the planet gears. Therefore, the lubrication of the planet bearings can be done unfailingly and the life of the planet bearings is further enhanced. For instance, the gear box of the present invention can be used even for the wind turbine generator located in a cold weather where the viscosity of the lubrication oil tends to rise.

With the above-described gear box for the wind turbine generator, it is preferable that the planet gear is supported to the planet pin via a pair of the planet bearings with a space therebetween, and the planet pins comprises an oil inlet port arranged between the pair of the planet bearings for leading the lubrication oil into the pair of the planet bearings.

By supporting the planet gear to the planet pin via the pair of the planet bearings, the load on each bearing can be dispersed and the life of the bearings can be enhanced. Furthermore, by providing the oil inlet port between the pair of the planet bearings, the pair of the planet bearings can be maintained in lubricated condition.

With the above-described gear box for the wind turbine generator, it is preferable that the inclined surface of the outer cylinder part has an incline angle α with respect to a radius direction of the planet pin, the incline angle α being in a range of $0° < α ≤ 40°$. Furthermore, the incline angle α is more preferable to be set in an range of $20° ≤ α ≤ 30°$.

The greater the incline angle α of the incline surface facing the planet bearings of the outer cylinder part of the carrier, the easier the lubrication oil can pass through the space between the outer cylinder part of the carrier and the planet bearings or the planet gears. In contrast, if the incline angle α is made too large, it is difficult to manufacture the carrier with such large incline angle. Thus, by setting the incline angle α in the range of $0°<α≤40°$ (more preferably $20°≤α≤30°$) as described above, both the enhanced life of the planet bearings and the manufacturing of the carrier with such inclined surface can be achieved.

With the above-described gear box for the wind turbine generator, it is preferable that the planet bearing is a self-aligning roller bearing in which the outer race has a concave raceway in an inner circumference thereof, the inner race has a convex raceway in an outer circumference thereof and a plurality of rows of the rollers are arranged between the inner raceway and the outer raceway, and each of the planet gears is fixed to the outer race of the planet bearing with an interference fit so that an end surface of the outer race of the planet bearing is located at an inner side of an end surface of the planet gear.

In this manner, by using the self-aligning roller bearing with self-alignment capability as a planet bearing, the durability of the planet bearings can be sustained even when the planet bearings receive the vibration or shock load associated with change of the wind. On the other hand, the inventors of the present invention had found the disadvantage of the self-aligning roller bearing that the life time of the planet bearing is shorter due to the flaking when using the self-aligning roller bearing. As a result of every research of the inventors, it was uncovered by the inventors that the shorter life time of the bearings occurred was caused by changes of the load and the moment transmitted to the planet bearings (self-aligning roller bearing) from the blades of the wind turbine generator via the rotor head and the main shaft whereby the outer race of the planet bearing comes out in the axial direction and therefore the load acted on each row of bearings becomes imbalanced with each other.

In view of this, as described above, each of the planet gears is fixed to the outer race of the planet bearing with an interference fit so that an end surface of the outer race of the planet bearing is located at an inner side of an end surface of the planet gear. With this structure, the flaking occurred when using the self-aligning roller bearing as the planet bearing can be prevented. This is because the end surface of the planet gear is deformed by the interference fit and functions as a cap to prevent the outer race of the planet bearing from coming out and the load acted on each row of bearings is kept balanced with each other.

Further, as described above, the inclined surface of the outer cylinder part of the carrier provided on both ends of the planet pins in the axial direction thereof and surrounding the outer circumference of the both ends thereof, inclines such that the farther from an axial center of the planet pin, the longer a distance between the incline surface and the planet bearing. Therefore, even if the end surface of the outer race of the planet bearing is located at an inner side of the end surface of the planet gear, the lubrication oil can still pass through the space between the outer cylinder part and the planet bearings or the planet gears.

In the case of fixing each of the planet gears to the outer race of the planet bearing with an interference fit, it is preferable that the planet gears are fixed to each outer race of the planet bearings with a shrink fit or cooling fit, respectively.

With this, the end surface of the planet gear is further deformed so the outer race of the planet bearings is prevented from coming out and the decline of life time of the planet bearing is further avoided.

With the above-described gear box for the wind turbine generator, it is further preferable that each of the planet gears comprises a flange portion provided in a position between the end surface of the outer race of the planet bearing and the end surface of the planet gear so as to prevent the outer race of the planet bearing from coming out.

In this manner, the end surface of the planet gear may be deformed by the interference fit or deformed by providing the flange portion in the inner circumference of the planet gear so that the outer race of the planet bearing is unfailingly prevented from coming out and the decline in the life time of the planet bearing is further decreased.

In this case, the flange portion may be a C-shaped snap ring fit into a groove provided in the inner surface of the planet gear or a ring member screwed with a female screw provided in the inner surface of the planet gear.

A wind turbine generator of the present invention comprises: the rotor head equipped with blades; the main shaft coupled to the rotor head and rotating with rotor head; the gear box described hereinabove for increasing rotation speed to transmit rotation input from the main shaft to the output shaft; and the generator coupled to the output shaft of the gear box.

Further, with the above wind turbine generator, the inclined surface of the outer cylinder part of the carrier provided on both ends of the planet pins in the axial direction thereof and surrounding the outer circumference of the both ends thereof, inclines such that the farther from an axial center of the planet pin, the longer a distance between the incline surface and the planet bearing so that the lubrication oil can still pass easily through the space between the outer cylinder part and the planet bearings or the planet gears. Therefore, the lubrication of the planet gears is securely performed and the life of the planet bearings is further improved.

In the present invention, according to the gear box for the wind turbine generator, the inclined surface of the outer cylinder part of the carrier provided on both ends of the planet pins in the axial direction thereof and surrounding the outer circumference of the both ends thereof, inclines such that the farther from an axial center of the planet pin, the longer a distance between the incline surface and the planet bearing so that the lubrication oil can still pass easily through the space between the outer cylinder part and the planet bearings or the planet gears. Therefore, the lubrication of the planet gears is securely performed and the life of the planet bearings is further improved.

BRIEF DESCRIPTION OF THE DRAWINGS

FIG. 9($a$) is a sectional view showing the planet gear equipped with the flange portion. FIG. 9($b$) and FIG. 9($c$) are enlarged views showing an example of structure of flange portions.

BEST MODE FOR CARRYING OUT THE INVENTION

A preferred embodiment of the present invention will now be described in detail with reference to the accompanying drawings. It is intended, however, that unless particularly specified, dimensions, materials, shape, its relative portions and the like shall be interpreted as illustrative only and not limitative of the scope of the present invention.

First Embodiment

A wind turbine generator in relation to FIG. 1 will be explained hereinafter.

Figure 1:
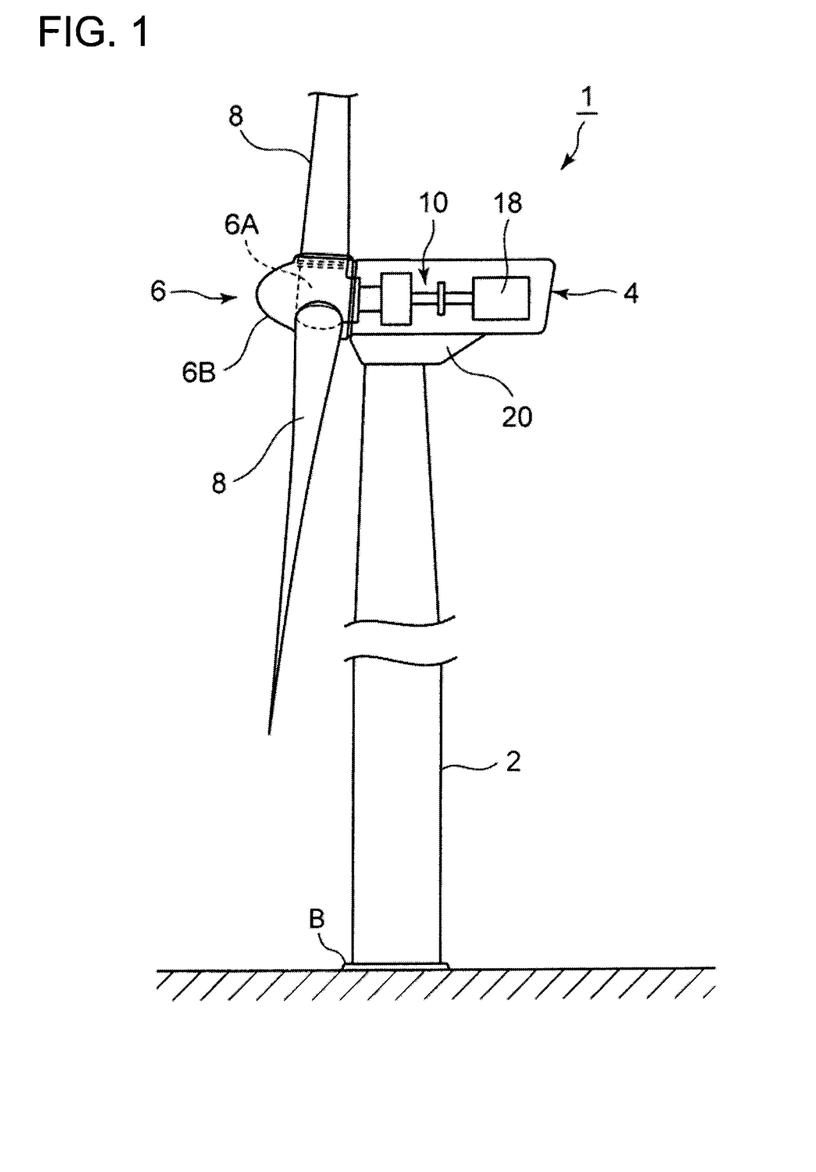
FIG. 1 is a view showing an example of the overall structure of a wind turbine generator.

FIG. 1 is a view showing an example of the overall structure of a wind turbine generator. The wind turbine generator 1 mainly includes, as shown in FIG. 1, a tower 2 provided to stand on a foundation B, a nacelle 4 provided on the upper end of the tower 2, a rotor head provided on the nacelle 4, and a plurality of blades 8 attached to the rotor head 6.

As shown in FIG. 1, the tower 2 has a column-like shape extending upwardly (to the upper end of FIG. 1) from the foundation B. The tower 2, for example, can be made from a single column-like member or made from a plurality of units aligned in upright direction and coupled to each other. If the tower 2 is made from the plurality of units, the nacelle 4 is provided on the unit located on the top of the tower 2.

The nacelle 4 supports the rotor head 6 and accommodates a drive train 10 and a generator 18, etc.

Figure 2:
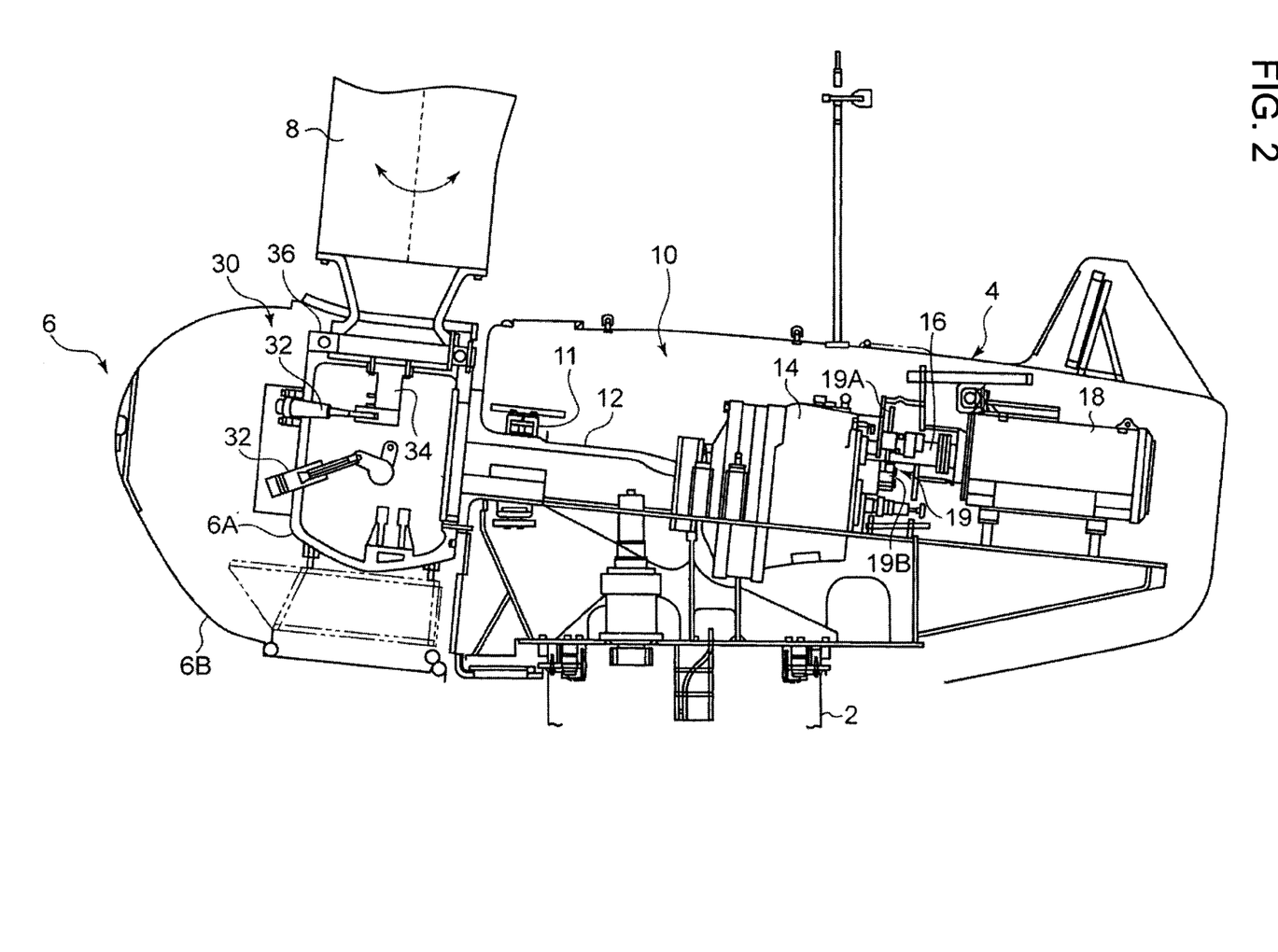
FIG. 2 is a traverse view showing a drive train and a generator provided within a nacelle.

FIG. 2 shows a detailed view of the drive train 10 and the generator 18 inside the nacelle 4. The drive train 10 includes a main shaft 12 that is connected to a rotor hub 6A of the rotor head 6, a gear box 14 connected to the main shaft 12 and a coupling 16 that couples the gear box 14 to the generator 18.

The main shaft 12 is connected to the rotor hub 6A so that it rotates with the blades 8 and the rotor head 6, and is secured to the casing side by the main shaft bearing 11 in a rotatable fashion. A grease feeding opening (not shown) is provided on the upper part of the main shaft bearing 11 to supply grease for lubrication.

The gear box 14 is arranged between the main shaft 12 and the coupling 16. The gear box 14 increases the rotational speed inputted via the main shaft 12 from the rotor head 6 side and transmits the increased rotational speed to the coupling 16. This gear box 14, for example, increases a rotational speed of approximately 20 rpm inputted via the main shaft 12 from the rotor head 6 side to approximately 1800 rpm, then transmits it to the generator 18 via the coupling 16. The detailed structure of the gear box 14 will be explained hereinafter.

The coupling 16 is a shaft join that couples a final output shaft of the gear box 14 to an input shaft of the generator 18. For example, a deflection shaft joint may be used as the coupling 16 so as to absorb misalignment between the final output shaft of the gear box 14 and the input shaft of the generator 18.

Further the coupling 16 is provided with a brake device 19 equipped with a brake disk 19A and brake pads 19B. The brake device 19 brakes the coupling 16 by pressing and squeezing the brake pads 19B to both surfaces of the brake disk 19A. For example, the brake device 19 may be structured so that the brake pads 19B bias constantly to the brake disk 19A by a spring (not shown) and disengages from the brake disk 19A against bias force of the spring during normal operation phase by an oil pressure force.

Normally, braking the wind turbine generator 1 is mainly carried out by pitch control which will be later described, and the brake device 19 is used supplementarily. That is, when the rotation axis needs to be stopped due to the strong wind or during maintenance, pitch control is first carried out to transfer the blades 8 into a feathering state. Then, after the rotational speed of the rotation axis has been sufficiently reduced, the brake device is used to bring the rotation axis to a complete stop.

The rotor head 6 shown in FIG. 1 and FIG. 2 is rotatably supported on the nacelle 4 with a rotation axis substantially extending horizontal direction, and includes a rotor hub 6A equipped with blades 8 and a head capsule 6B for covering the rotor hub 6A.

Further, as shown in FIG. 2, the rotor hub 6A is equipped with a pitch driving device 30 that rotates the blades 8 around the rotation axis (in a direction designated by an arrow in FIG. 2) and varies the pitch angle of the blades 8.

As shown in FIG. 2, the pitch drive device 30 includes a cylinder 32 and a rod 34 connected to the blades 8. The blades 8 are rotatably supported by a rod bearing 36 for rotating in the direction of the pitch. Due to this structure, when the rod 34 is rotated by the cylinder 32, the blades 8 rotate with the rod 34 in the pitch direction. The pitch driving devices 30 are provided in each of the blades 8 and connect together by a link mechanism that is not shown, and may be arranged so that pitch angle control of the blades is interconnected.

Figure 3:
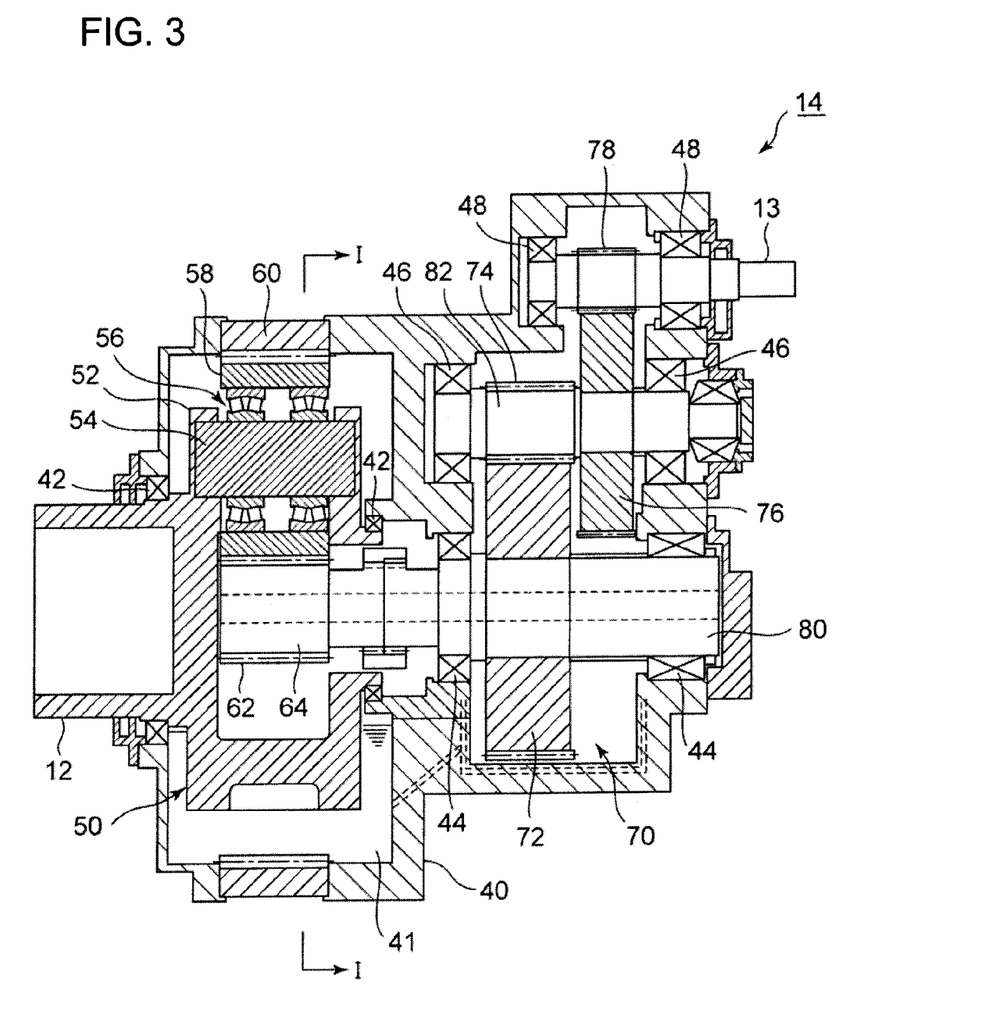
FIG. 3 is a sectional view showing an example of a gear box in relation to a first embodiment of the present invention.
Figure 4:
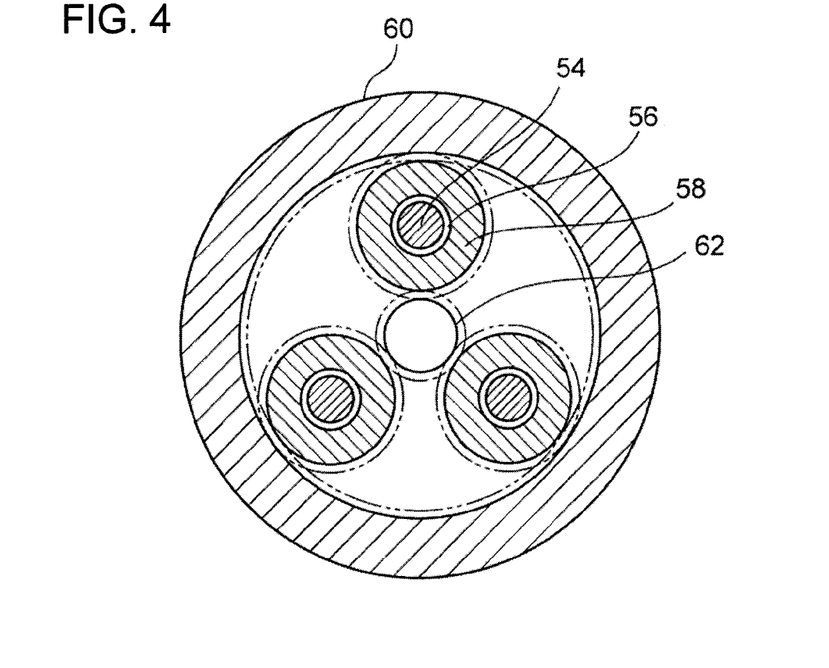
FIG. 4 is a sectional view along lines I-I of FIG. 3.
Figure 5:
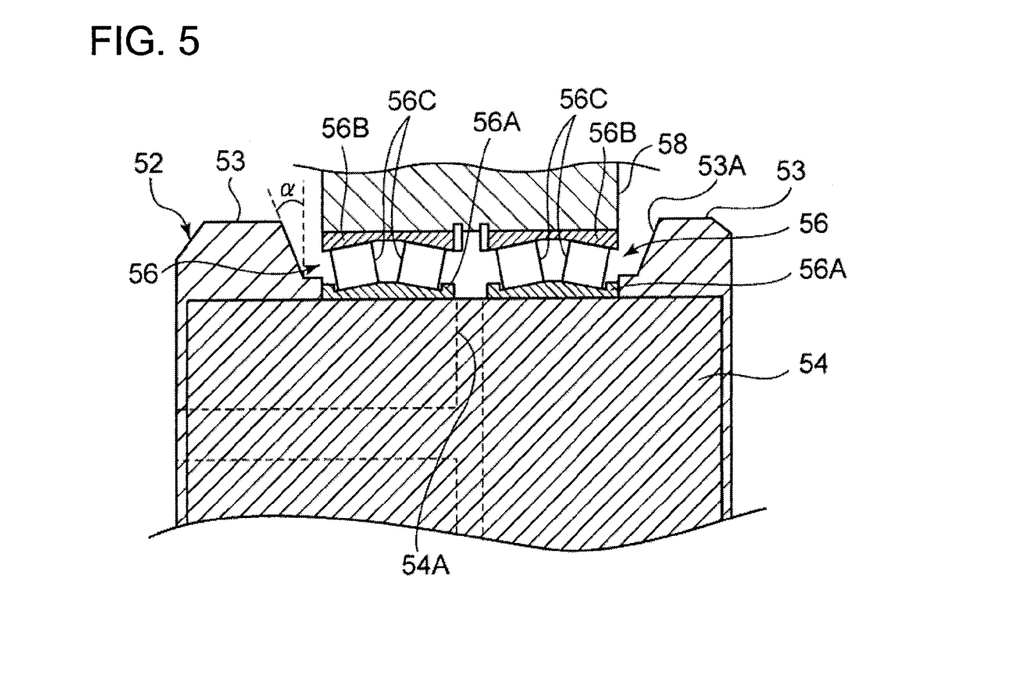
FIG. 5 is an enlarged view showing around the planet bearing of FIG. 3.

Next, the detailed structure of the gear box 14 of the wind turbine generator 1 will be described. FIG. 3 is a sectional view showing an example of the gear box 14. FIG. 4 is a sectional view along lines I-I of FIG. 3. FIG. 5 is an enlarged view showing around a planet bearing of the gear box 14 shown in FIG. 3.

As shown in FIG. 3, the gear box 14 includes a planetary gear type speed increasing mechanism 50 and a spur gear type speed increasing mechanism 70, accommodated within the casing 40. This gear box 14 increases rotation speed input from the main shaft 12 of the rotor hub side and transmits the increased speed rotation to the final output shaft 13. The final output shaft 13 of the gear box 14 is connected to the generator 18 side via the coupling 16 as shown in FIG. 2.

The planetary gear type speed increasing mechanism 50 of the gear box 14 includes, as shown in FIGS. 3 and 5, a carrier 52, a plurality of planet pins 54 held to the carrier 52, a plurality of planet bearings 56 supported to the planet pins 54, respectively, a plurality of planet gears 58 supported to the planet pins 54 via the planet bearings 56, respectively, and a ring gear 60 and a sun gear 62 meshed with the planet gears 58.

The carrier 52 is a supporting plate for supporting the plurality of the planet pins 54 (three pins in this example), and holds the planet pins 54 by an outer cylinder part 53 provided on both ends of the planet pins 54 in axial direction of the planet pin and surrounding the outer circumference of the both ends of the planet pins as shown in FIG. 5. With this structure, the carrier 52 is rotated integrally with the main shaft 12 of the rotor head side so that the carrier 53 revolves the planet pins 54 held to the outer cylinder part 53. The main shaft 12 and the carrier 52 are supported, rotatably to the casing 40 via a bearing 42.

The cylinder outer part 53 of the carrier 52 includes a inclined surface 53A facing the planet bearing 56 and the inclined surface 53A is formed such that the inclined surface inclines away from the planet bearing 54 as it gets farther from the axial center. In this manner, the inclined surface 53A of the outer cylinder part 53 of the carrier 52 inclines farther away from the planet bearing 56 as it gets farther from the axial center of the planet pin 54 so that lubricating oil from an oil bath which will be described later can easily pass through the space between the inclined surface 53A and the planet bearings 56 or the planet gear 58.

The inclined surface 53A of the outer cylinder part 53 facing the planet gear 56 has an incline angle α with respect to a radius direction of the planet pin in the range of 0°<α≤40°. It is more preferable that the incline angle, α is set in the range of 20°≤α≤30°

The greater the incline angle α of the inclined surface 53A facing the planet bearings 56, the easier the lubrication oil can pass through the space between the outer cylinder part 53 of the carrier 52 and the planet bearings 56 or the planet gears 58. In contrast, if the incline angle α is made too large, it is difficult to manufacture the carrier 52 with such large incline angle.

Thus, as suggested above, it is preferable to set the incline angle α of the inclined surface 53A in the range of 0°<α≤40° (more preferably 20°≤α≤30°) so that both the enhanced life of the planet bearings and the manufacturing of the carrier with such inclined surface can be achieved.

The planet bearing 56 supports the planet gear 58 rotatably to the planet pin 54, and includes a plurality of rows of the rollers 56C (two rows in this example) provided between an inner race 56A and an outer race 56B as shown in FIG. 5. In this example, the planet bearing has two rows of the rollers 56C but the row of the rollers can be a single row or three rows or more.

In the view of keeping the durability of the planet bearing 56 against the vibration or shock load associated with change of the wind, the self-aligning roller bearing with self-aligning capability may be used. For instance, as shown in FIG. 5, the planet bearing may be used, which has the outer race 56B with the concave raceway in an inner circumference thereof, the inner race 56A with the convex raceway in an outer circumference thereof and a plurality of rows of the rollers 56C between the inner raceway and the outer raceway.

In the planet bearing 56 (the self-aligning roller bearing), the center of the track of the outer race 56B coincides with the center of the bearing to exercise self-aligning characteristics.

It is possible to use a plurality of the planet bearings 56 arranged parallel with each other as shown in FIGS. 3 and 5, when being applied to a large-size wind turbine generator. In such case, it is preferable to provide the plurality of the planet bearings while keeping a distance from each other, further to provide a oil inlet port 54A on the planet pin 54 in a position between the adjacent planet bearings 56 for leading lubricating oil into the pair of planet bearings. Thus, the planet bearings 56 can be maintained in the lubrication state.

The planet gears 58 shown in FIGS. 3 and 5 are supported to the planet pins 54 via the planet bearing 56, respectively, and meshed with the ring gear 60 and a sun gear 62.

As shown in FIG. 3, the ring gear 60 is provided on the casing 40, and includes an inner teeth meshed with the planet gears 58. On the other hand, the sun gear 62 as shown in FIG. 4, provided to be surrounded by a plurality of the planet gears 58. A planetary output shaft 64 is fitted into the sun gear 62.

In this planetary type speed increasing mechanism 50, the planet pins 54 and the planet gears 58 supported to the planet pins 54 are revolved around the sun gear 62 as a center, when the carrier 52 is rotated with the main shaft 12. At the same time, each of the planet gears 58 is rotated around each of the planet pins 54 as a center via each of the planet bearings 56. Thus, the rotational speed input from the main shaft 12 as an input shaft is increased and output to the planetary output shaft 64. The speed increasing ratio of the planetary type speed increasing mechanism 50 is defined by each number of teeth of the planet gear 58, the ring gear 60 and the sun gear 62.

The casing 40 includes, as shown in FIG. 3, an oil bath 41 provided below the planetary type speed increasing mechanism 50, and lubrication oil is reserved in the oil bath 41. Each of the planet gears 58 supported to the planet pin 54 via the planet bearing 56 is soaked in the lubrication oil within the oil bath 41, when each of the planet gears moves down by the revolution. Thus, the planet bearings 56 and the planet gears 58 can be maintained in the lubrication state.

The spur gear type speed increasing mechanism 70 shown in FIG. 3 is a gear box optionally provided in addition to the planetary gear type speed increasing mechanism 50, and increases the rotational speed of the planetary output shaft 64 and outputs to the final output shaft 13.

The spur gear type speed increasing mechanism 70 includes, for example as shown in FIG. 3, two gear sets comprising a gear set of a first spur gear 72 and a second spur gear 74 meshed with each other, and a gear set of a third spur gear 76 and a fourth spur gear 78 meshed with each other. The first spur gear 72 is fixed to a first rotational shaft 80 connected to the planetary output shaft 64, the second spur gear 74 and the third spur gear 76 are fixed to a second rotational shaft 82, and the fourth spur gear 78 is fixed to the final output shaft 13. The first rotational shaft 80, the second rotational shaft 82 and the final output shaft 13 are supported by a first bearing 44, a second bearing 46 and a third bearing 48, respectively.

In this spur gear type speed increasing mechanism 70, the number of the teeth of the first spur gear 72 is set larger than the number of the teeth of the second spur gear 74 so that the rotational speed of the first rotational shaft 80 connected to the planetary output shaft 64 of the planetary type speed increasing mechanism 50 side is increased and transmitted to the second rotational shaft. And the number of the teeth of the third spur gear 76 is set larger than the number of the teeth of the fourth spur gear 78 so that the rotational speed of the second rotation shaft 82 is increased and transmitted to the final output shaft 13.

According to the gear box 14 arranged as above, the rotational speed input from the main shaft 12 of the rotor hub side can be increased by the planetary type speed increasing mechanism 50 and the spur gear type speed increasing mechanism 70, and transmitted to the final output shaft 13.

As explained above, in the present embodiment, the carrier 52 of the gear box 14 has the inclined surface 53A facing the planet bearing 56 inclined outward from the planet bearing 56 in a radius direction of the planet pin 54 and thus the lubrication oil can easily pass through between the outer cylinder part 53 and the planet bearings 56 or the planet gears 58. Therefore, the lubrication of the planet bearings can be done unfailingly and the life of the planet bearings 58 is further enhanced. For instance, the gear box 14 of the present invention can be used even for the wind turbine generator 1 located in a cold weather where the viscosity of the lubrication oil tends to rise.

Further, in the present embodiment, preferably the planet gear 58 of the gear box 14 is supported to the planet pin 54 via a pair of the planet bearings 56 with a space therebetween, and the planet pins 54 comprises the oil inlet port 54A arranged between the pair of the planet bearings 56 for leading the lubrication oil into the pair of the planet bearings 56. By supporting the planet gear 58 to the planet pin 54 via the pair of the planet bearings 56, the load on each bearing can be dispersed and the life of the bearings 56 can be enhanced. Furthermore, by providing the oil inlet port 54A between the pair of the planet bearings 56, the pair of the planet bearings 56 can be maintained in lubricated condition.

Furthermore, in the present embodiment, the carrier 52 of the gear box 14 is preferably constructed so that the incline angle .alpha. of the inclined surface 53A is set in the range of 0°<α≤40° (more preferably 20°≤α≤30°) so that both the enhanced life of the planet bearings and the manufacturing of the carrier with such inclined surface can be achieved.

Second Embodiment

Next, a second embodiment relating to the wind turbine generator will be explained. The wind turbine generator of the second embodiment shares the same structure with the first embodiment except for the positional relation of planet bearing 56 and the flange portion of the planet gear 58 in the gearbox 14. Hereinafter, the same reference numerals are used for the same structure components as the first embodiment and will not be further explained.

Figure 6:
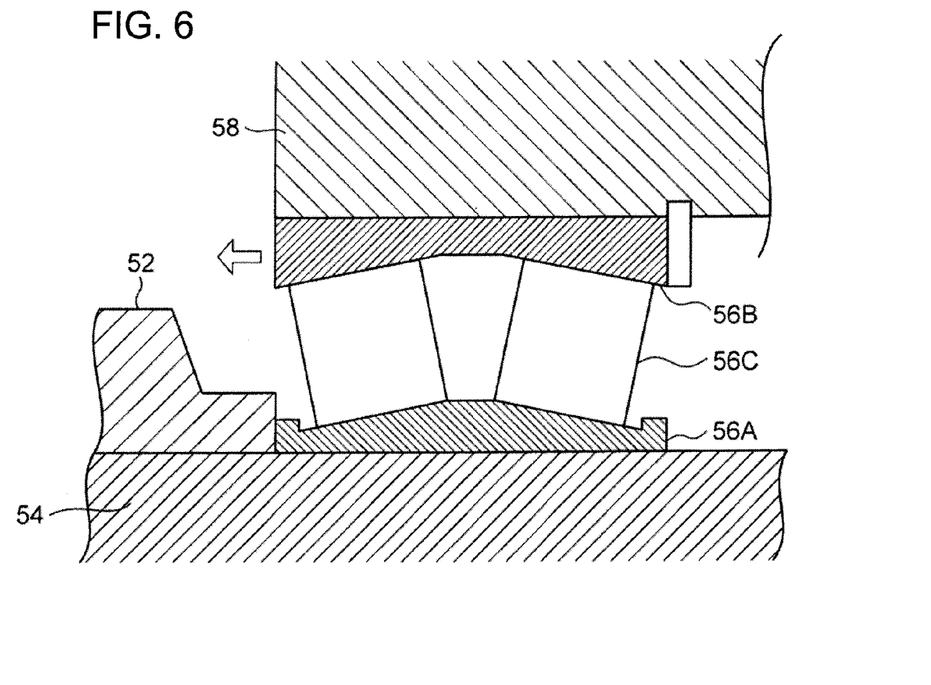
FIG. 6 is a sectional view showing the coming out of the outer race of the self-aligning roller bearing.
Figure 7:
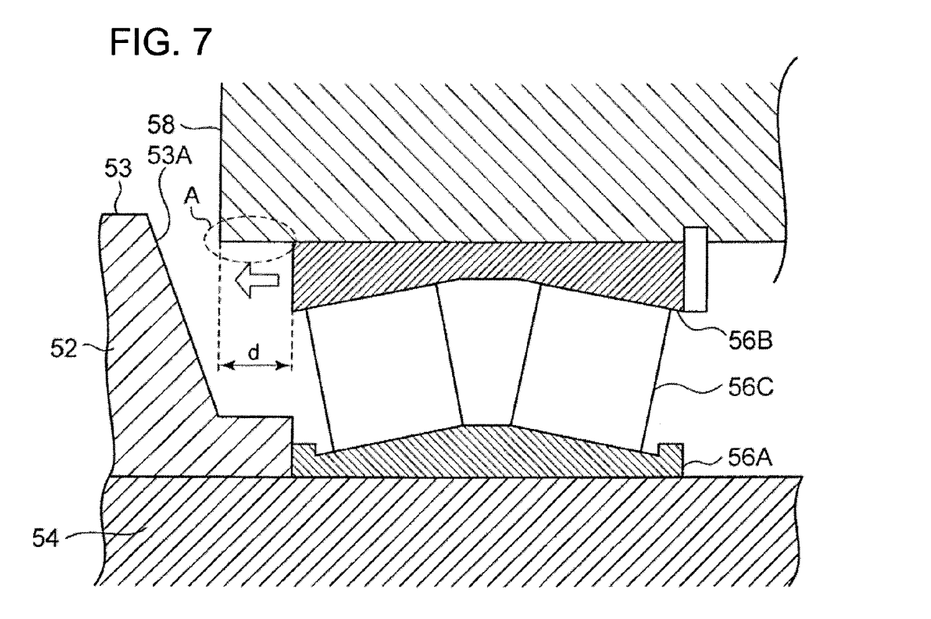
FIG. 7 is an enlarged view showing around the planet bearing of the gear box in relation to a second embodiment.

FIG. 6 is an enlarged view showing around the planet bearing in the case of using the self-aligning roller bearing as the planet bearing 56. FIG. 7 is an enlarged view showing around the self-aligning roller bearing of the gear box in the wind turbine generator in relation to the present embodiment.

The inventors of the present invention had come up with their recognition that when using the self-aligning roller bearings having the outer race 56B with a concave raceway in the inner circumference thereof, the inner race 56A with a convex raceway in the outer circumference thereof, and a plurality of rows of the rollers 56C between the inner raceway and the outer raceway, the life span of the planet bearing 56 may be shortened by flaking in the gear box 14. As a result of every research of the inventors, it was uncovered by the inventors that the decline in the life time of the bearings occurred was caused by changes of the load and the moment transmitted to the planet bearings (self-aligning roller bearing) 56 from the blades 8 of the wind turbine generator 1 via the rotor head 6 and the main shaft 12 whereby the outer race 56B of the planet bearing 56 comes out in the axial direction (the direction shown as an arrow in FIG. 6) and therefore the load acted on each row 56C of bearings becomes imbalanced with each other.

Specifically, the planet bearing 56 tends to come out outward in the axial direction by the carrier 52. The inner race 56A of the planet bearing is restrained from moving outward in the axial direction by the outer cylinder part 53. On the other hand, the outer race 56B of the planet bearing 56 is not restrained from moving in such direction, and therefore only the outer race 56B can come out. Accordingly, the load is concentrated on the roller-row 56C located inside (the row on the right side in FIG. 6), and therefore the flaking of the planet bearing 56 occurs.

In consideration of above, in the present embodiment, each of the planet gears 58 is fixed as shown in FIG. 6 to the outer race 56B of the planet bearing 58 with an interference fit so that the end surface of the planet gear 56B of the planet bearing 56 is located at an inner side of the end surface of the planet gear 58 (i.e., the distance d between the end surface of the outer race 56B and the end surface of the planet bearing 56 as shown in FIG. 7 is set to satisfy the inequality d>0). Thus, the end portion (shown as A in the figure) of the planet gear 58 is deformed by the interference fit to work as a lid to prevent the outer race 56B of the planet bearings 56 from coming out and to keep the load acted on each roller-row 56C even, and finally the decline in the life time of the planet bearings 56 can be reduced.

It is preferable that the distance d between the end surface of the outer race 56B and the end surface of the planet gear 58 is greater in the view of preventing the shortening of the life time of the planet bearing 56 (self-aligning roller bearing). However, if the end surface of the outer race 56B is set too close to the inner side of the end surface of the planet gear, there is a structural limitation that, in reference to FIG. 5, the oil inlet port 54A for leading the lubrication oil into the pair of the planet bearings 56 may be obstructed. Therefore, it is preferable to set the above distance d in a range of 0 mm<d≤10 mm.

Figure 8:
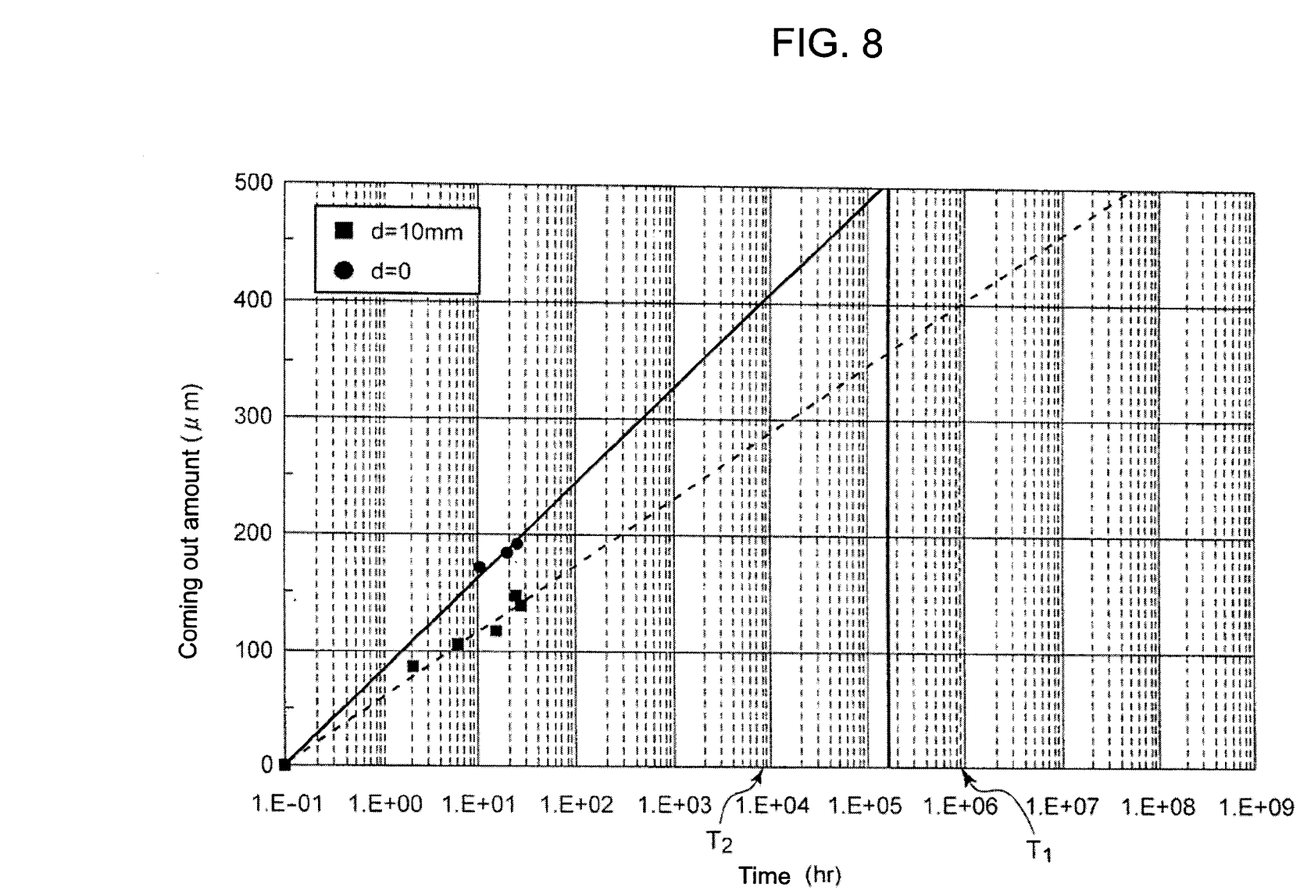
FIG. 8 is a graphic diagram showing the test result of the coming out amount of the outer race of the bearing.

FIG. 8 is a graphic diagram showing the test result of the coming out amount of the outer race 56B of the bearing 56. In this figure, the case in which the end surface of the outer race 67B of the gear 56 is located at an inner side of the end surface of the planet gear 58 by 10 mm (d=10 mm) and also a comparison example in which the end surface of the outer race 56B is located at the end surface of the planet gear 58 (d=0 mm) are shown.

As the time period that the coming out amount of the outer race 56B reaches 400 μm is estimated from the graph of FIG. 8, $T_1$ in the case of d=10 mm is approximately 109 times of $T_2$ in the case of d=0.

The inventors already had the recognition that the flaking of the planet bearing 56 occurred when the coming out amount of the outer race 56B is around 400 μm $T_1$ and $T_2$ are the index of endurance time of the planet gear 56 in the case of d=10 mm and d=0 mm respectively. The endurance time T1 estimated in this manner in the case of d=10 mm is above $1.3 \times 10^5$ (hr) which is the acceptance criteria of ordinal practical products in general while T.sub.2 estimated in the same manner in the case of d=0 mm does not satisfy the criteria.

In consideration of the result, by fixing the planet gear to the outer race 56B of the planet bearing 56 with an interference fit such that the end surface of the outer race 56B of the planet bearing 56 is located inner side of the end surface of the planet gear 58, the coming out of the outer race 56B of the planet bearing 56 is prevented and the decline in the endurance time of the planet bearing 56 due to the flaking is suppressed.

Furthermore, in the present embodiment, in a similar manner as the first embodiment, the inclined surface 53A facing the planet bearing 56 inclines such that the farther from an axial center of the planet pin 54, the longer a distance between the incline surface and the planet bearing 56. Thus, as described above, with the end surface of the outer race 56B of the planet bearing 56 located inner side of the end surface of the planet gear 58, the lubrication oil can still unfairly pass through between the surface 53A of the outer cylinder part 53 and the planet bearing 56 or the planet gear 58.

Moreover, in the example shown in FIG. 7, the example of preventing the outer race 56B of the planet bearing 56 from coming out by fixing the end portion of the planet gear 58 to the outer race 56B of the planet bearing 56 with an interference fit. In the view of more certainly preventing the coming out of the outer race 56B, a flange portion may be provided in the end surface of the planet gear 58

Figure 9A:
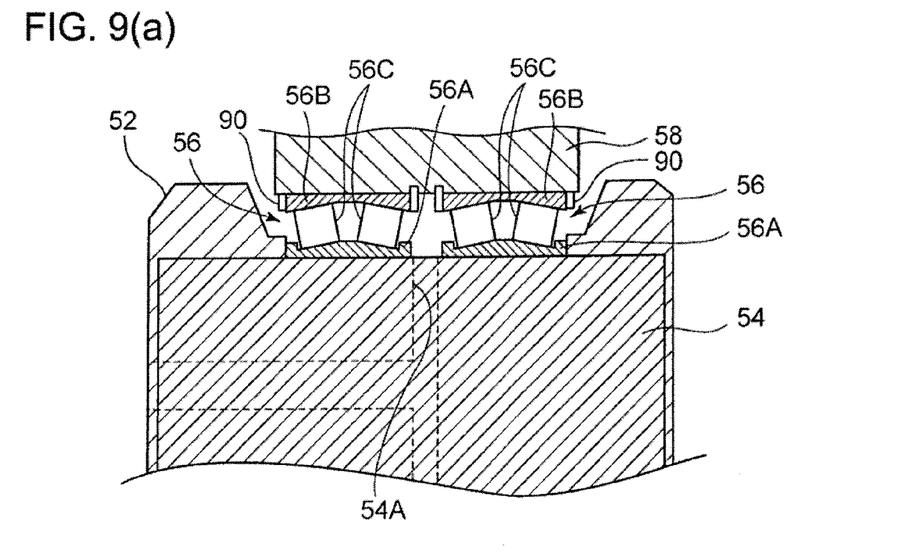
Figure 9B:
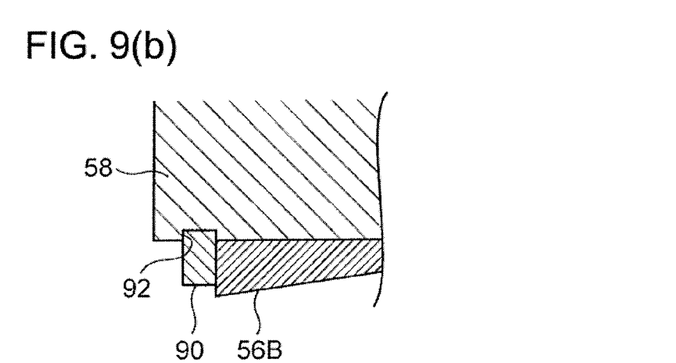
Figure 9C:
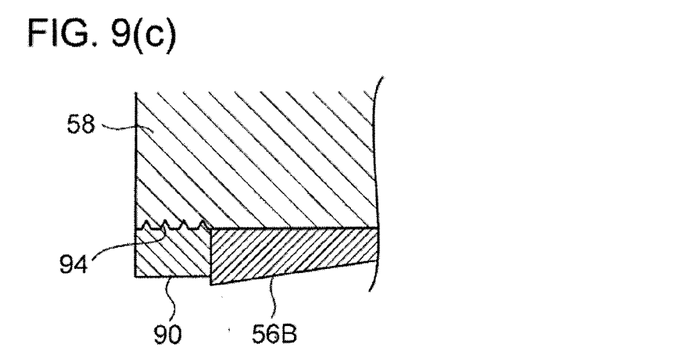

FIG. 10(a) is a sectional view showing the planet gear 58 equipped with the flange portion, FIGS. 10(b) and 10(c) are enlarged views showing an example of structure of flange portions, respectively. It should be noted that the elements that are the same as that of the above embodiment are denoted with the same reference numeral as used in the above embodiment.

As shown in FIG. 9(a), a flange portion 90 for preventing the outer race of the planet bearing 56 is provided in a position between the end surface of the outer race 56B of the planet bearing 56 and the end surface of the planet gear 58. According to such arrangement, the flange portion 90 is provided in the inner surface of the planet gear 58 while the end portion of the planet gear 58 is deformed by the interference fit. Therefore, the outer race 56B of the planet bearing 56 can be prevented more certainly from coming out, and thus the decline in the endurance time of the planet bearing 56 can be reduced more certainly.

For example, it is possible to adopt as the flange portion 90 a C-shaped snap ring fit into a groove 92 provided in the inner surface of the planet gear 58 as shown in FIG. 9(*b*), or a ring member screwed with a female screw 94 provided in the inner surface of the planet gear 58 as shown in FIG. 9(C)

The invention claimed is:

1. A gear box for a wind turbine generator which comprises a main shaft coupled to a rotor head with blades and configured to rotate with the rotor head, the gear box comprising:
    a casing;
    a carrier having a plurality of planet pins and rotating with the main shaft of the wind turbine generator;
    planet roller bearings installed to the planet pins of the carrier, respectively, each of the bearings including rollers provided between an inner race and an outer race;
    a plurality of planet gears supported rotatably to the planet pins via the planet bearings, respectively;
    a ring gear provided in the casing and having an inner tooth meshed with the planet gears;
    a sun gear surrounded by the planet gears and meshed with the planet gears; and
    an oil bath provided in a lower part of the casing and configured to reserve lubrication oil inside,
    wherein the carrier comprises an outer cylinder part provided on both ends of the planet pins in an axial direction of the planet pin and surrounding the outer circumference of the both ends of the planet pins so as to hold the planet pins, and
    wherein the outer cylinder part of the carrier includes an inclined surface facing the planet bearing, the inclined surface inclining outward from the planet bearing in a radius direction of the planet pin,
    wherein the outer race has end faces in the axial direction, the end faces of the outer race including a first end face that is the nearest to the outer cylinder part,
    wherein the inner race has end faces in the axial direction, the end faces of the inner race including a second end face that is the nearest to the outer cylinder part, and
    wherein at least a part of the inclined surface is located between the first end face of the outer race and the second end face of the inner race as seen in the axial direction.

2. The gear box for the wind turbine generator according to claim 1, wherein the planet gear is supported to the planet pin via a pair of the planet bearings with a space therebetween, and the planet pin comprises an oil inlet port arranged between the pair of the planet bearings for leading the lubrication oil into the pair of the planet bearings.

3. The gear box for the wind turbine generator according to claim 1, wherein the inclined surface of the outer cylinder part has an incline angle α with respect to a radius direction of the planet pin, the incline angle α being in a range of $0° < \alpha \leq 40°$.

4. A wind turbine generator comprising:
    a rotor head equipped with blades;
    a main shaft coupled to the rotor head and rotating with rotor head;
    the gear box according to claim 1 for increasing rotation speed to transmit rotation input from the main shaft to an output shaft; and
    a generator coupled to the output shaft of the gear box.

5. The gear box for the wind turbine generator according to claim 1, wherein a radially inner end of the inclined surface is located between said first end face of the outer race and said second end face of the inner race as seen in the axial direction.

6. The gear box for the wind turbine generator according to claim 1, wherein the outer cylinder part includes a restraining portion for restraining the inner race from coming out, the restraining portion extending toward the inner race from the inclined surface in the axial direction.

7. The gear box for the wind turbine generator according to claim 6, wherein the restraining portion is provided around the planet pin, and
    wherein the restraining portion includes an outer circumferential surface located between said first end face of the outer race and said second end face of the inner race as seen in the axial direction.

8. The gear box for wind turbine generator according to claim 6, wherein the restraining portion extends toward the inner race so that at least a part of the restraining portion is located between the planet gear and the planet pin in a radial direction of the planet pin.

9. The gear box for wind turbine generator according to claim 1,
    wherein the planet bearing includes a self-aligning roller bearing in which the outer race has a recessed raceway in an inner circumference thereof, the inner race has a projected raceway in an outer circumference thereof and a plurality of rows of the rollers are arranged between the inner raceway and the outer raceway, and
    wherein each of the planet gears extends in the axial direction so that an outer-race end face of the outer race is located on an inner side of a planet-gear end face of said each of the planet gears, and said each of the planet gears has a deformed inner surface at a region between the outer-race end face and the planet-gear end face which is deformed by a compressive force from the outer race due to an interferential fit between said each of the planet gears and the outer race so as to function as a cap to prevent the outer race from coming out.

10. The gear box for wind turbine generator according to claim 9, wherein the interference fit is a shrink fit or cooling fit.

11. The gear box for wind turbine generator according to claim 9, wherein each of the planet gears comprises a flange portion provided on the region so as to prevent the outer race of the planet bearing from coming out.

12. The gear box for wind turbine generator according to claim 11, wherein the flange portion is a C-shaped snap ring configured to fit into a groove provided in the inner surface of the planet gear.

13. The gear box for wind turbine generator according to claim 11, wherein the flange portion is a ring member configured to be screwed with a female screw provided in the inner surface of the planet gear.

* * * * *